(12) United States Patent
Hung et al.

(10) Patent No.: US 7,746,608 B2
(45) Date of Patent: *Jun. 29, 2010

(54) METHODOLOGY TO GUARD ESD PROTECTION CIRCUITS AGAINST PRECHARGE EFFECTS

(75) Inventors: Chih-Ming Hung, McKinney, TX (US); Charvaka Duvvury, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 499 days.

This patent is subject to a terminal disclaimer.

(21) Appl. No.: 11/548,019

(22) Filed: Oct. 10, 2006

(65) Prior Publication Data

US 2007/0103826 A1    May 10, 2007

Related U.S. Application Data

(60) Provisional application No. 60/732,507, filed on Nov. 2, 2005.

(51) Int. Cl.
*H02H 9/00* (2006.01)
(52) U.S. Cl. .................. 361/56; 361/91.1; 361/111; 257/355; 257/356; 257/357; 257/358; 257/359; 257/360; 324/452; 324/457; 324/765
(58) Field of Classification Search .................. 361/56, 361/91.1, 111; 257/255–260, 355–360; 324/452, 324/457, 765
See application file for complete search history.

(56) References Cited

U.S. PATENT DOCUMENTS

| | | | |
|---|---|---|---|
| 5,086,365 A * | 2/1992 | Lien | 361/58 |
| 5,440,162 A * | 8/1995 | Worley et al. | 257/355 |
| 5,731,941 A * | 3/1998 | Hargrove et al. | 361/56 |
| 6,249,410 B1 * | 6/2001 | Ker et al. | 361/56 |
| 6,621,673 B2 * | 9/2003 | Lin et al. | 361/56 |
| 6,912,109 B1 * | 6/2005 | Ker et al. | 361/56 |
| 6,920,026 B2 * | 7/2005 | Chen et al. | 361/56 |
| 7,212,387 B2 * | 5/2007 | Duvvury et | 361/56 |
| 7,224,560 B2 * | 5/2007 | May et al. | 361/56 |
| 2001/0033004 A1 * | 10/2001 | Lin et al. | 257/360 |

\* cited by examiner

*Primary Examiner*—Jared J Fureman
*Assistant Examiner*—Terrence R Willoughby
(74) *Attorney, Agent, or Firm*—Warren L. Franz; Wade J. Brady, III; Frederick J. Telecky, Jr.

(57) ABSTRACT

An ESD protection circuit (710) is guarded by a parallel first precharge elimination circuit (720) relative to an I/O pad (721) and a parallel second precharge elimination circuit (730) relative to a VDD pad (731). The precharge elimination circuits are synchronized with the ESD protection circuit to eliminate any precharge voltage to ground before an ESD pulse affects the I/O pad or VDD pad. A diode (722) is connected between I/O pad and VDD. Circuit (720) is between I/O pad and ground (740) and is powered by the same VDD. Circuit (720) includes a first resistor (723), a first nMOS transistor (724), and a first RC timer including a second resistor (725) and a first capacitor (726). Circuit (730) includes a third resistor (733), a second nMOS transistor (734), and a second RC timer including a fourth resistor (735) and a second capacitor (736).

3 Claims, 4 Drawing Sheets

METHODOLOGY TO GUARD ESD PROTECTION CIRCUITS AGAINST PRECHARGE EFFECTS

FIELD OF THE INVENTION

The present invention is related in general to the field of electronic systems and semiconductor devices; and, more specifically, to structures and methods relating to electrostatic discharge devices including precharge elimination features.

DESCRIPTION OF THE RELATED ART

Integrated circuits (ICs) may be severely damaged by electrostatic discharge (ESD) events. A major source of ESD exposure to ICs is from the human body (described by the "Human Body Model", HBM); the discharge of the human body generates peak currents of several amperes to the IC for about 100 ns. A second source of ESD is from metallic objects (described by the "Machine model", MM); it can generate transients with significantly higher rise times and current levels than the HBM ESD source. A third source is described by the "charged device model" (CDM), in which the IC itself becomes charged and discharges to ground in rise times less than 500 ps.

ESD phenomena in ICs are growing in importance as the demand for higher operating speed, smaller operating voltages, higher packing density and reduced cost drives a reduction of all device dimensions. This generally implies thinner dielectric layers, higher doping levels with more abrupt doping transitions, and higher electric fields—all factors that contribute to an increased sensitivity to damaging ESD events.

The most common protection schemes used in metal-oxide-semiconductor (MOS) ICs rely on the parasitic bipolar transistor associated with an nMOS device whose drain is connected to the IC pin to be protected and whose source is tied to ground potential. The protection level or failure threshold can be set by varying the nMOS device width from the drain to the source under the gate oxide of the nMOS device. Under stress conditions, the dominant current conduction path between the protected pin and ground involves the parasitic bipolar transistor of that nMOS device. This parasitic bipolar transistor operates in the snapback region under pin positive with respect to ground stress events.

The dominant failure mechanism found in the nMOS protection device operating as a parasitic bipolar transistor in snapback conditions (the bipolar turn-on at snap-back occurs at the collector/drain voltage Vt1 with an associated collector/drain current It1), is the onset of second breakdown. Second breakdown is a phenomenon that induces thermal runaway in the device wherever the reduction of the impact ionization current is offset by the thermal generation of carriers. Second breakdown is initiated in a device under stress as a result of self-heating. The peak nMOS device temperature, at which secondary breakdown is initiated, is known to increase with the stress current level. The second breakdown trigger current It2 is widely used as an ESD strength monitor.

It has recently been found that the relentless scaling trend in semiconductor technologies has made the ESD protection devices much more sensitive to noise generated by the high pin-count testers, which are routinely used to evaluate semiconductor products for sensitivity to HBM and MM stresses. A further trend is that IC products migrate towards high pin-count products. ESD testers, however, have not kept up with the increased parasitics of the high pin-count sockets and boards that are used to test the ICs. Obviously, the testers have to be trustworthy in order to deliver undistorted pulses to evaluate the ESD robustness of semiconductor products, but the testers have been found to be severely lacking unambiguous testing performance.

Noise pulses are generated by the testers during different time periods of an ESD event; specifically, pulses trailing the ESD event were found which are not within the intended JEDEC or ESDA test methods. The trailing pulse can falsely cause oxide stress; as a result, the input parametrics of input high (VIH) and/or input low (VIL) can shift to undesirable levels and the units are declared as not passing ESD. Consequently, the test results have been found to be misleading with respect to the ESD evaluation of semiconductor products. Such false data may not only lead to wasted resources, lost time, and customer misunderstanding, but also lead to situations where true versus false ESD levels are not determined properly.

SUMMARY OF THE INVENTION

Applicants investigated distinct noise pulses before an ESD event, which often erroneously declare the tested device as faulty. Applicants have further developed a concept for IC pads so that any spurious voltage build-up before an ESD event can be disabled by discharging it to ground. The full ESD protection capability available at each pad is thus restored and available in undiminished strength to discharge the ESD pulse.

One embodiment of the invention is an integrated circuit which includes an ESD protection circuit guarded by a precharge elimination circuit.

Another embodiment of the invention is an integrated circuit, which has an input/output (I/O) pad and a power supply (VDD) pad. A diode is between the I/O pad and VDD line so that the diode cathode is connected to VDD and the diode anode is connected to the I/O pad. A first precharge elimination circuit is between the I/O pad and ground potential, wherein the precharge elimination circuit is powered by the same VDD. A second precharge elimination circuit is between the VDD pad and ground potential. An ESD protection circuit is between VDD and ground potential, whereby the ESD protection circuit is in parallel with the first and the second precharge elimination circuit and powered by the same VDD.

The first precharge elimination circuit includes a first resistor connected to the I/O pad (the first resistor is preferably 10 kΩ and operates as discharge resistor). A first nMOS transistor is in series with the first resistor so that the first transistor drain is connected to the first resistor and the first transistor source and body are connected to ground. A first RC timer is connected to the first nMOS transistor gate; the first RC timer includes a second resistor (preferably about 50 kΩ) connected to ground and a first capacitor (preferably about 10 pF) connected to VDD.

The second precharge elimination circuit includes a third resistor connected to the VDD pad (the third resistor is preferably 10 kΩ and operates as discharge resistor). A second nMOS transistor is in series with the third resistor so that the second transistor drain is connected to the third resistor and the second transistor source and body are connected to ground. A second RC timer is connected to the second nMOS transistor gate; the second RC timer includes a fourth resistor (preferably about 50 kΩ) connected to ground and a second capacitor (preferably about 10 pf) connected to VDD.

The first precharge elimination circuit is synchronized with the ESD protection circuit to eliminate any precharge voltage to ground before an ESD pulse affects the I/O pad, and the second precharge elimination circuit is synchronized with the ESD protection circuit to eliminate any precharge voltage to ground before an ESD pulse affects the VDD pad.

Another embodiment of the invention is an integrated circuit with an ESD protection circuit, which has a precharge elimination circuit only for I/O pads. Another embodiment of the invention is an integrated circuit with an ESD protection circuit including a precharge elimination circuit only for VDD pads. In either embodiment the precharge elimination circuit includes resistor, nMOS transistor and RC timer as described above, and is thus synchronized with the ESD protection circuit.

A technical advantage of the invention is its simplicity so that it can easily be adopted into any integrated circuit and integrated circuit testing methodology.

Embodiments of the present invention are related to the testing of advanced deep submicron technology devices with shallow trench isolation, especially salicided nMOS transistors. Such transistors are for instance employed in wireless devices, or in Application Specific products, or in mixed signal and logic devices.

Another technical advantage of the invention is its universal application. The precharge elimination circuit according to the invention eliminates any ESD failures from malfunction of the protection devices.

The technical advances represented by the invention, as well as the aspects thereof, will become apparent from the following description of the preferred embodiments of the invention, when considered in conjunction with the accompanying drawings and the novel features set forth in the appended claims.

DETAILED DESCRIPTION OF THE PREFERRED EMBODIMENTS

Figure 1:
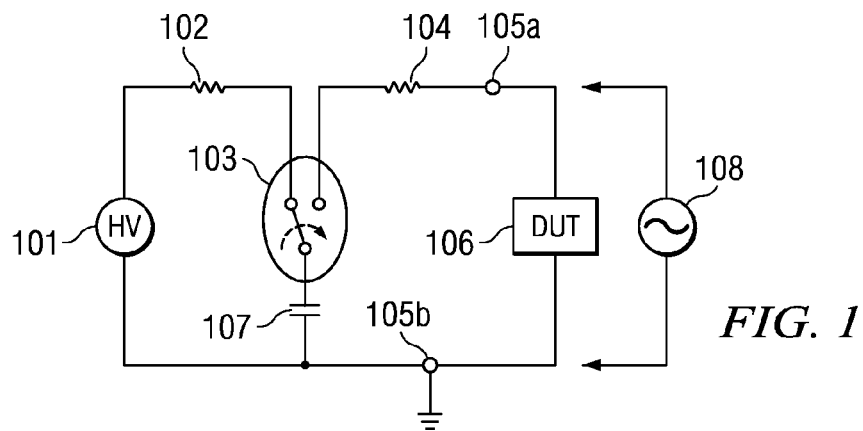
FIG. 1 shows a schematic circuit diagram of the ESD tester for testing a semiconductor device according to the Human Body Model.

FIG. 1 depicts a schematic circuit diagram of the ESD testers employed to test semiconductor products of various technologies according to the requirements of the Human Body Model (HBM). The high voltage generator 101 delivers about 8 kV (up to 15 kV) and is connected, through first resistor 102 of about 1 to 5 MΩ, to the on/off switch relay 103. Typically, commercial testers employ relays 103 which operate in a partially ionized ambient and are thus inclined to arc; in the case of arcing, the high voltage supply 101 is able to provide a leakage current.

Relay 103 is connected, through a second resistor 104 of about 1.5 kΩ, to the sockets 105a and 105b for the device-under-test 106. Socket 105b is at ground potential. A capacitor 107 of about 100 pF is connected to relay 103, to the high voltage generator 101, and to the socket 105b for the device-under-test 106. Capacitor 107 is operable to discharge high energy pulses through device 106. An oscilloscope 108 monitors the observed voltage versus time waveforms, which are experienced by device 106.

Figure 2:
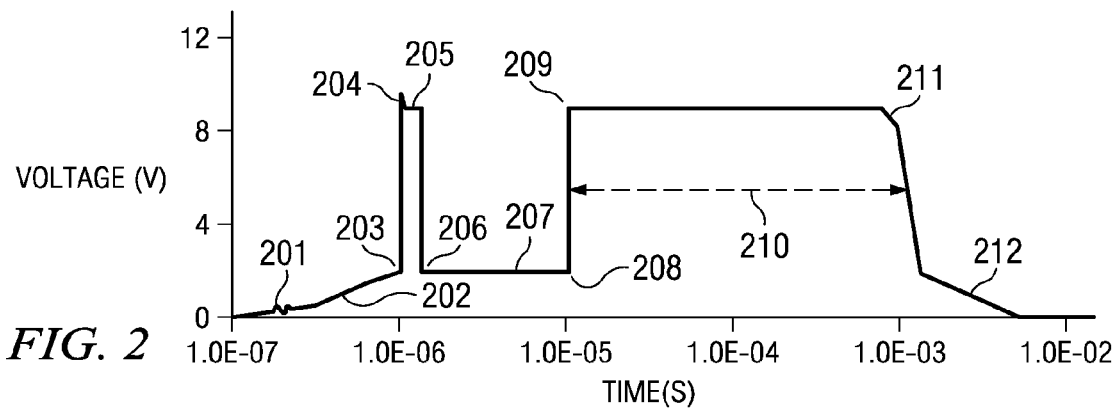
FIG. 2 displays the voltage observed at the tester socket as a function of time. The time scale is logarithmic.

FIG. 2 records schematically the voltage (ordinate, linear scale) versus time (abscissa, logarithmic scale) waveforms experienced by a contemporary device 106, produced in scaled technology, in socket 105, using an HBM tester. The region 201 shows some erratic early rise ringing due to electromagnetic cable interference (coupling between relay and cables). At 203, the circuit switch is being closed and the HBM test starts. Just prior, at 202, some voltage pre-charge due to arcing is recorded; this region is not part of the JEDEC test specification, but now recognized to be part of the real-world HBM pulse. Pre-charge 202 can build up voltages on terminals of the ESD device causing the ESD protection to prematurely fail; precharge 202 could thus give rise to false ESD results and therefore requires suppression.

The practical method recognized by Applicants to discharge any precharge to ground is a circuit structure embedded in ESD protection devices without impact on ESD protection performance. The additional circuit structure is transparent to circuit applications. As described below, the additional circuit structure is small in area, can thus be integrated in any ESD device, and is also effective to other known ESD issues.

Referring to FIG. 2, at 204, some inductive ringing due to the fast dV/dt is seen, just prior to the triggering of the ESD protection device at 205. The protection device clamps at about 5 to 10 V; the voltage level 205 is determined by the clamp device. The length of time of the protection device action is listed as approximately 0.3 to 0.5 µs before the end of the HBM test at 206. During the long turn-off of the ESD event, due to the decaying current, the voltage reduces to near zero for a length of time of approximately 5 µs (curve portion 207 in FIG. 2) and then brings the protection device out of snapback at point 208, rising the potential to its Vt1 of about 9.3 V (point 209 in FIG. 2).

Long after the ESD pulse is expected to be over (after about 5 to 10 µs), a trailing pulse begins at 209 and continues for a surprisingly long duration of about 700 to 1000 µs (curve portion 210), before it terminates at 211 and starts to slowly decay at 212. In this critical region, a current of about 300 µA is seen, supplied by the high voltage source (101 in FIG. 1). The origin of this misleading trailing pulse is an arcing in the test relay, where the high voltage supply provides the leakage current. This current magnitude is proportional to the stress voltage level. The renewed clamping is again at about 9.3 V, since current is supplied to the protection device to only reach its trigger point but not its designed clamping voltage. Clearly, region 210 is not part of the test standard and gives rise to false ESD results. The duration of region 210 coupled with the magnitude of the current frequently causes a degradation of the oxide layer of the device-under-test, producing an erroneous failure result. For the thin oxide layer of many products, a current of even 10 µA, flowing for a period of about 1000 µs, is already enough to damage the oxide layer.

Figure 3:
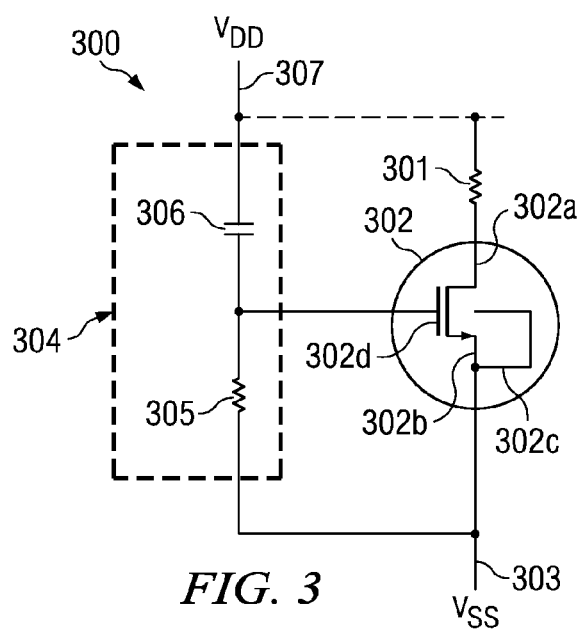
FIG. 3 is a schematic circuit diagram of the precharge elimination circuit according to an embodiment of the invention.

FIG. 3 illustrates schematically the circuit diagram of the precharge elimination circuit of the invention, generally designated 300. The precharge elimination circuit 300 operates whether the precharge (and the trailing pulse) are generated by an impending ESD event or by a function of the test equipment (see FIG. 1).

Circuit 300 includes resistor 301, which is connected to the pad-to-be-protected (I/O pad see FIG. 4, VDD pad see FIG. 5) and is operable as a discharge resistor. Resistor 301 is a large resistor and has preferably a value between 1 and 100 kΩ, more preferably about 10 kΩ. Resistor 301 limits the leakage current in normal device operation; it also protects transistor 302 during ESD events. In series with resistor 301 is an nMOS transistor 302. It is a relatively small transistor with a preferred channel length of about 0.12 μm and a width of about 5 μm. The drain 302a of transistor 302 is connected to resistor 301; the source 302b and the body 302c of transistor 302 are connected to VSS (ground potential) 303.

Connected to the gate 302d of transistor 302 is an RC timer 304, which includes resistor 305 and capacitor 306. The RC time constant formed by resistor 305 and capacitor 306 as part of the precharge elimination circuit is designed to be comparable to the rise time of the precharge pulse. Resistor 305 has preferably a value of about 50 kΩ and is connected to VSS (ground) 303. Capacitor 306 has preferably a value of about 10 pF and is connected to power supply VDD (307). By using the power supply 307 for the control of the nMOS transistor 302, the precharge elimination circuit 300 is synchronized with the ESD protection circuit (see FIGS. 4 and 5); it is thus effectively guarding the protection circuit and enabling it to function properly to discharge the ESD event.

Figure 4:
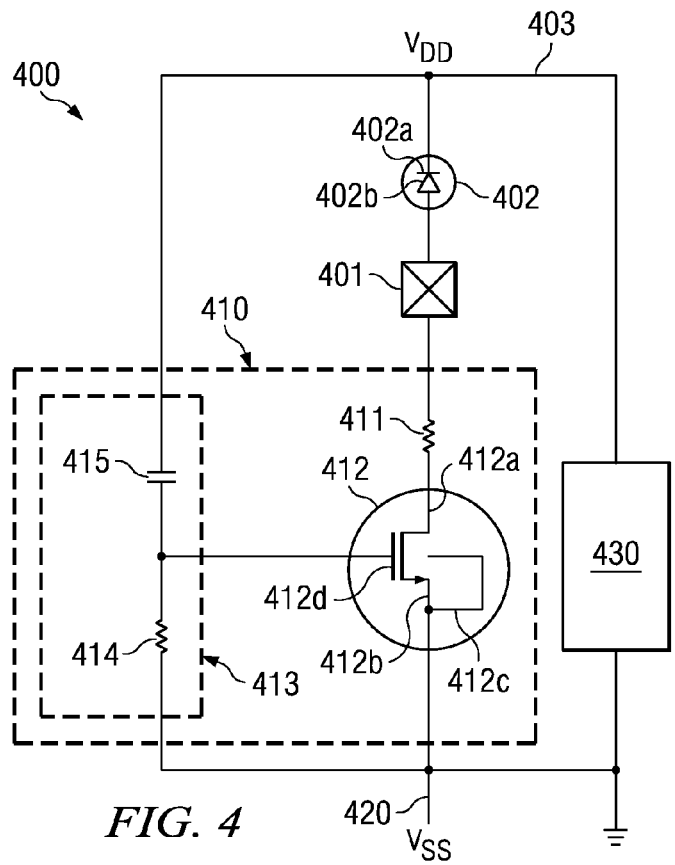
FIG. 4 is a schematic circuit diagram of an ESD protection circuit guarded by a precharge elimination circuit, for an input/output pad.

The circuit diagram of FIG. 4 illustrates an embodiment of the precharge elimination circuit for guarding the ESD protection circuit of an input/output (I/O) pad of an integrated circuit. The guarded protection circuitry, generally designated 400, includes the I/O pad 401 and a diode 402 between the I/O pad 401 and the power supply (VDD) line 403. The diode cathode 402a is connected to VDD and the diode anode 402b is connected to the I/O pad 401.

The guarded protection circuitry further includes the precharge elimination circuit 410 between the I/O pad 401 and ground potential (VSS) 420. As FIG. 4 shows, the precharge elimination circuit 410 is powered by the same VDD 403. Circuit 410 includes resistor 411, which is connected to the pad-to-be-protected (I/O pad 401) and is operable as a discharge resistor. Resistor 411 has preferably a value between 1 and 100 kΩ, more preferably about 10 kΩ. In series with resistor 411 is an nMOS transistor 412, which preferably has a channel length of about 0.12 μm and a width of about 5 μm. The drain 412a of transistor 412 is connected to resistor 411; the source 412b and the body 412c of transistor 412 are connected to VSS (ground potential) 420.

Connected to the gate 412d of transistor 412 is an RC timer 413, which includes resistor 414 and capacitor 415. Resistor 414 has preferably a value of about 50 kΩ and is connected to VSS (ground) 420. Capacitor 415 has preferably a value of about 10 pF and is connected to power supply VDD (403). By using the power supply 403 for the control of the nMOS transistor 412, the precharge elimination circuit 410 is synchronized with the ESD protection circuit 430 (see FIG. 6) to eliminate any precharge voltage to ground before an ESD pulse affects the I/O pad 401. Circuit 410 is thus effectively guarding the protection circuit 430 and enabling it to function properly to discharge the ESD event.

As FIG. 4 shows, ESD protection circuit 430 between VDD line 403 and ground potential 420 is in parallel with the precharge elimination circuit 410 powered by the same VDD 430.

Figure 5:
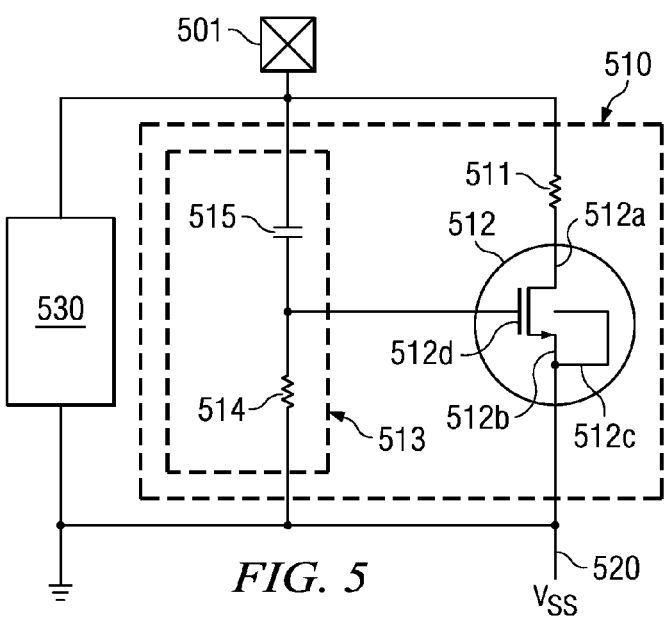
FIG. 5 is a schematic circuit diagram of an ESD protection circuit guarded by a precharge elimination circuit, for a power supply pad.

The circuit diagram of FIG. 5 illustrates an embodiment of the precharge elimination circuit 510 for guarding the ESD protection circuit 530 of a power supply (VDD) pad 501 of an integrated circuit. Precharge elimination circuit 510 is between VDD pad 501 and ground potential (VSS) 520. Consequently, the precharge elimination circuit is powered by VDD.

Circuit 510 includes resistor 511, which is connected to the pad-to-be-protected (VDD pad 501) and is operable as a discharge resistor. Resistor 511 has preferably a value between 1 and 100 kΩ, more preferably about 10 kΩ. In series with resistor 511 is an nMOS transistor 512, which preferably has a channel length of about 0.12 μm and a width of about 5 μm. The drain 512a of transistor 512 is connected to resistor 511; the source 512b and the body 512c of transistor 512 are connected to VSS (ground potential) 520.

Connected to the gate 512d of transistor 512 is an RC timer 513, which includes resistor 514 and capacitor 515. Resistor 514 has preferably a value of about 50 kΩ and is connected to VSS (ground) 520. Capacitor 515 has preferably a value of about 10 pF and is connected to power supply VDD (501).

By using the power supply 501 for the control of the nMOS transistor 512, the precharge elimination circuit 510 is synchronized with the ESD protection circuit 530 (see FIG. 6) to eliminate any precharge voltage to ground before an ESD pulse affects the VDD pad 501. Circuit 510 is thus effectively guarding the protection circuit 530 and enabling it to function properly to discharge the ESD event.

As FIG. 5 shows, ESD protection circuit 530 between VDD 501 and ground potential 520 is in parallel with the precharge elimination circuit 510 powered by the same VDD 501.

Figure 6:
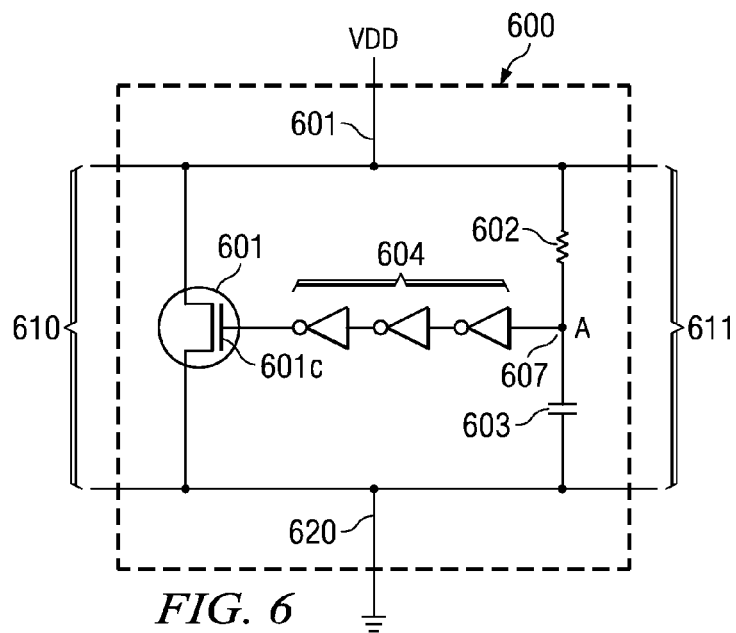
FIG. 6 displays more detail of the ESD protection circuit in FIGS. 4 and 5.

FIG. 6 illustrates the schematic diagram of the ESD protection circuit 600; the protection circuit is designated 430 in FIG. 4 and 530 in FIG. 5. Protection circuit 600 is between power supply (VDD) 601 and ground potential 620. Connections 610 lead to the precharge elimination circuit for an I/O pad, in parallel with the protection circuit 600; connections 611 lead to the precharge elimination circuit for a VDD pad, in parallel with the protection circuit 600.

The RC-timed circuit 600 includes the large nMOS FET 601 (in the case of p-type substrates), which preferably has a channel length of about 0.12 μm and a width of about 2000 μm. Transistor 601 works in channel conduction mode during an ESD event; this means, transistor gate 601c is pulled high with a long time constant. Resistor 602 (preferably about 100 kΩ) and capacitor 603 (preferably about 10 pF) along with the three-inverter-stage 604 control the gate 601c of transistor 601 during an ESD event. Consequently, it would have a deleterious effect, if a pre-charge were present, because in this case, node A (designated 607) would already be at a voltage of about 2 to 3 V and the efficiency of the protection device 600 would thus be lost. The precharge elimination circuit 610 or 611, in parallel with circuit 600, will ensure that node A remains at 0 V before the ESD event begins.

Figure 7:
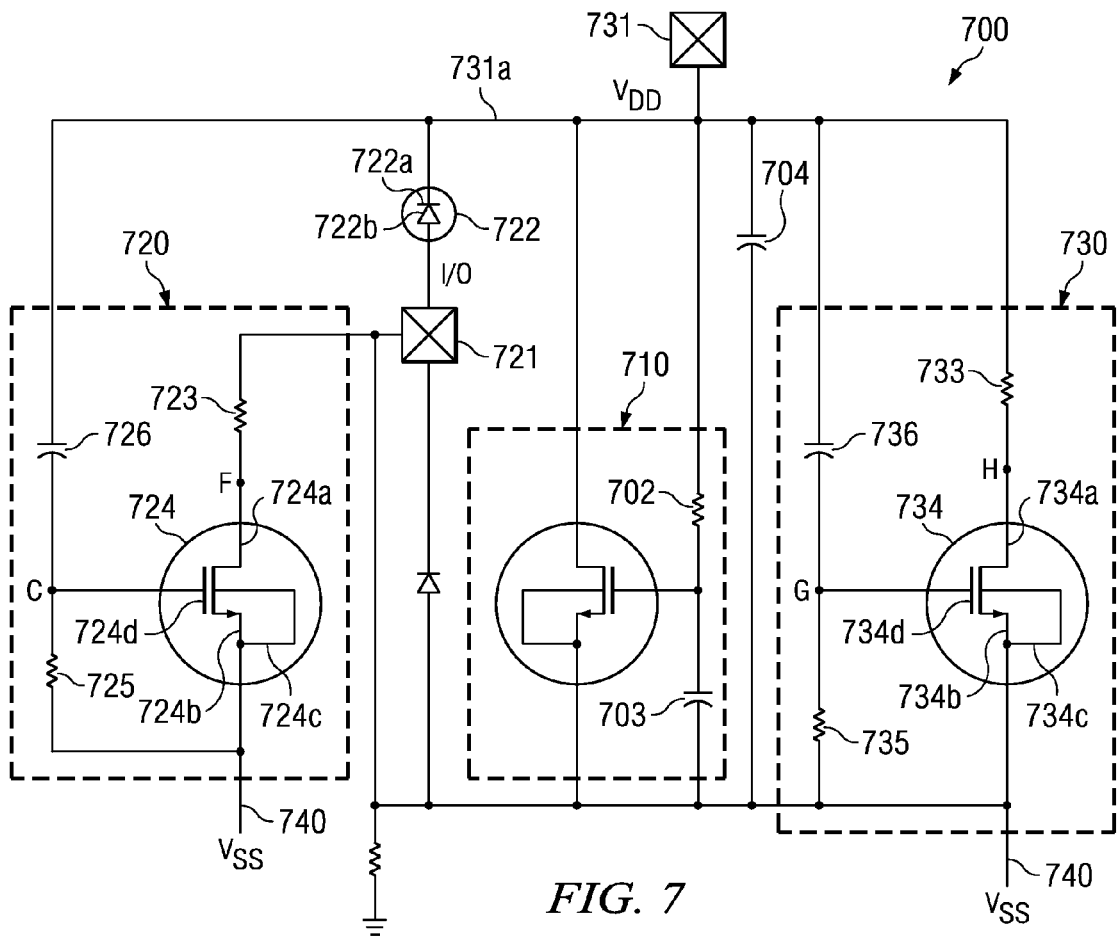
FIG. 7 is a schematic circuit diagram of an ESD protection circuit with a first precharge elimination circuit guarding an input/output pad and a second precharge elimination circuit guarding a power supply pad.

FIG. 7 shows the circuit diagram of an embodiment 700, wherein an ESD protection circuit 710 is guarded by a first precharge elimination circuit 720 relative to an I/O pad 721, and a second precharge elimination circuit 730 relative to a VDD pad 731. A diode 722 is connected between I/O pad 720 and VDD line 731a so that the diode cathode 722a is connected to VDD and the diode anode 722b is connected to the I/O pad.

The first precharge elimination circuit 720, serving the I/O pad 721, is between the I/O pad and ground potential 740; the precharge elimination circuit 720 is powered by the same VDD 731a.

The second precharge elimination circuit 730, serving the VDD pad 731, is between the VDD pad and ground potential 740.

The ESD protection circuit 710 is between VDD 731a and ground potential and is in parallel with the first and the second precharge elimination circuit, and powered by the same VDD.

The first precharge elimination circuit 720 includes a first resistor 723 (between about 1 and 100 kΩ, preferably 10 kΩ) connected to the I/O pad; the first resistor is operable as a discharge resistor. Further, circuit 720 includes a first nMOS transistor 724 in series with the first resistor 723. The first transistor drain 724a is connected to the first resistor 723, and the first transistor source 724b and body 724c are connected to ground 740. A first RC timer is connected to the first nMOS transistor gate 724d; the first RC timer includes a second resistor 725 (about 50 kΩ) connected to ground and a first capacitor 726 (about 10 pF) connected to VDD 731a.

The second precharge elimination circuit 730 includes a third resistor 733 (between about 1 and 100 kΩ, preferably 10 kΩ) connected to the VDD pad; the third resistor is operable as a discharge resistor. Further, circuit 730 includes a second nMOS transistor 734 in series with the third resistor 733. The second transistor drain 734a is connected to the third resistor 733, and the second transistor source 734b and body 734c are connected to ground 740. A second RC timer is connected to the second nMOS transistor gate 734d; the second RC timer includes a fourth resistor 735 (about 50 kΩ) connected to ground and a second capacitor 736 (about 10 pF) connected to VDD.

In the ESD protection device 710, resistor 702 is preferably about 100 kΩ, and capacitor 703 is preferably about 10 pF. Capacitor 704 has preferably a value of about 200 pF.

Figure 8:
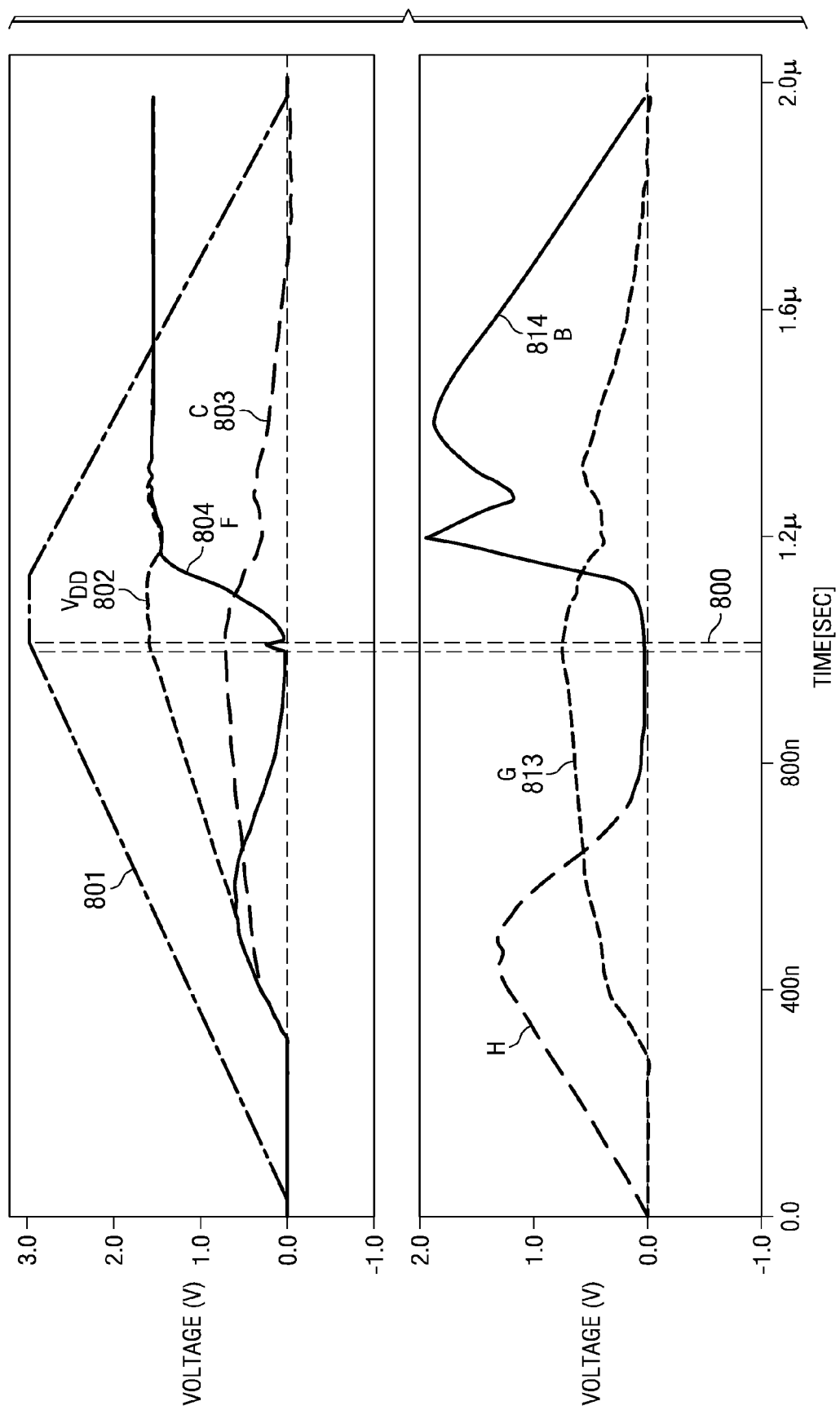
FIG. 8 displays the voltage observed at several nodes of the circuit of FIG. 7, as a function of time (linear scale).

The first and the second precharge elimination circuit are synchronized with the ESD protection circuit 710 to eliminate any precharge voltage to ground before an ESD pulse affects the I/O pad or the VDD pad. This guarding effect is demonstrated by the simulation waveforms recorded in FIG. 8 at various nodes of the circuit in FIG. 7. FIG. 8 plots the voltage (in volts) at each node as a function of time (in nanoseconds and microseconds) just before and after the onset of an ESD pulse. The onset of the ESD pulse is assumed at the time marked by the double line 800.

In curve 801, a precharge is applied at the rate of 3 V/μs. The corresponding VDD curve is shown by 802. Node C is at the gate 724d of the nMOS transistor 724 in the first precharge elimination circuit 720; waveform 803 records the voltage curve. Node G is at the gate 734d of the nMOS transistor 734 in the second precharge elimination circuit 730; waveform 813 records the voltage curve.

The waveform 804 at node F in circuit 720 demonstrates how the precharge voltage at node A (I/O pad) is effectively eliminated, with a small time constant, by the guard circuit 720 for the I/O pad 721. The waveform 814 at node H in circuit 730 demonstrates how the precharge voltage at node B (VDD pad) is effectively eliminated, with a small time constant, by the guard circuit 730 for the VDD pad 731. Consequently, at the time of the ESD pulse onset the I/O pad and the VDD pad do not exhibit any precharge.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description.

As an example, the precharge elimination circuit, in addition to eliminating the precharge, has the advantage of also safely reducing the "trailing pulse", which has been recognized as an additional problem with the HBM testers. As another example, the precharge elimination circuit at I/O pins controls precharge for all stress combinations; it is applicable for both Fail-Safe (FS) and Non-Fail-Safe (NFS) devices. As another example, the precharge elimination circuit at VDD pins controls precharge for stress to VSS and to I/O, and also safely limits trailing pulses. On the other hand, the precharge elimination circuit is transparent to normal device operation and does not result in DC leakage.

As another example, the concept of the invention is effective for many semiconductor device technology nodes and not restricted to a particular one. It is therefore intended that the appended claims encompass any such modifications or embodiments.

We claim:

1. An integrated circuit comprising:
    a first terminal;
    a second terminal;
    an electrostatic discharge protection circuit coupled between the first and second terminals; and
    a precharge elimination circuit coupled between the first and second terminals and arranged to discharge a voltage across the first and second terminals before application of electrostatic discharge stress across the first and second terminals.

2. An integrated circuit comprising:
    a first terminal;
    a power supply terminal;
    a ground terminal;
    a diode coupled between the power supply terminal and the first terminal;
    a precharge elimination circuit coupled between the power supply terminal and the ground terminal and arranged to discharge a voltage across the first terminal and the ground terminal before application of electrostatic discharge stress; and
    an electrostatic discharge protection circuit coupled between the power supply and ground terminals, the electrostatic discharge protection circuit in parallel with the precharge elimination circuit.

3. An integrated circuit comprising:
    a power supply terminal;
    a ground terminal;
    a precharge elimination circuit between the power supply and ground terminals and arranged to discharge a voltage across the power supply and ground terminals before application of electrostatic discharge stress across the power supply and ground terminals; and
    an electrostatic discharge protection circuit coupled between the power supply and ground terminals, the electrostatic discharge protection circuit coupled in parallel with the precharge elimination circuit.

* * * * *